(12) United States Patent
Tulley

(10) Patent No.: US 6,619,463 B2
(45) Date of Patent: Sep. 16, 2003

(54) CONVEYING SYSTEM FOR USE IN A MANUFACTURING PLANT

(75) Inventor: Christopher Joseph Tulley, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 09/975,634

(22) Filed: Oct. 11, 2001

(65) Prior Publication Data

US 2003/0070901 A1 Apr. 17, 2003

(51) Int. Cl.$^7$ .............................................. B65G 37/00
(52) U.S. Cl. ................. 198/346.1; 198/346.2; 198/575
(58) Field of Search .................. 198/347.01, 346.1, 198/346.2, 346.3, 575, 570, 576

(56) References Cited

U.S. PATENT DOCUMENTS

| 907,790 | A | | 12/1908 | Hancock | |
|---|---|---|---|---|---|
| 2,254,208 | A | | 9/1941 | Brock | |
| 2,354,939 | A | | 8/1944 | Brock | |
| 3,133,496 | A | | 5/1964 | Dubuit | |
| 4,021,992 | A | | 5/1977 | Spaude et al. | |
| RE31,945 | E | | 7/1985 | Magni | |
| 4,722,653 | A | * | 2/1988 | Williams et al. | 198/346.2 X |
| 5,273,392 | A | * | 12/1993 | Bernard, II et al. | 198/346.2 X |
| 5,884,746 | A | * | 3/1999 | Leisner et al. | 198/346.1 |
| 5,960,930 | A | * | 10/1999 | Hawkins | 198/575 X |
| 6,223,881 | B1 | * | 5/2001 | Carle | 198/347.3 |
| 6,336,546 | B1 | * | 1/2002 | Lorenz | 198/346.2 |

* cited by examiner

Primary Examiner—James R. Bidwell
(74) Attorney, Agent, or Firm—Joseph P. Lally; Martin J. McKinley

(57) ABSTRACT

A conveying system including multiple conveying tracks where each track acts as the output track from one operation and the input track to a subsequent operation. When the manufacturing process at a first operational area is completed, the completed product is placed on the area's output track and conveyed to a subsequent operational area. When the processing at the subsequent area is completed, the unit is placed on the subsequent area's output track, which is a physically distinct track from the area's input track. The input and output tracks within an operational area may occupy different levels of a multi-level system in which the various levels share a common floor space footprint to conserve floor space requirements. The tracks may be configured as a pair of tracks to facilitate simultaneous processing of two products or jobs. In addition, one or more of the tracks may have a support surface that is not parallel to the manufacturing floor. A track may comprise a V-shaped rack in which a first surface of the rack is oriented at an angle with respect to the floor and in which a second surface is perpendicular to the first surface. The tilted orientation of the first surface may facilitate insertion and removal of product from totes within a confined space.

21 Claims, 3 Drawing Sheets

CONVEYING SYSTEM FOR USE IN A MANUFACTURING PLANT

BACKGROUND

1. Field of the Present Invention

The present invention generally relates to the field of conveyance systems for use in manufacturing environments and more particularly to a conveyor system having a conveying track dedicated for each manufacturing task.

2. History of Related Art

In the field of manufacturing, conveying systems are frequently encountered as a means for transporting work-in-progress among various operational areas of the manufacturing facility. Conventional conveying systems typically include a single conveying belt that conveys items along sequential stages in the manufacturing process. Because the conveying system consumes costly floor space, there is generally a disincentive to implementing multiple belts. The use of a single conveying belt, however, can contribute to reduced quality control because items may skip a stage in the manufacturing process due to operator error or other factors. If, for example, a manufacturing process uses a single conveying belt to transport product from an assembly area to a test area and then to a packing area, items may be conveyed to the packing area without having been tested because tested and untested items are situated on the same belt. It would be, therefore, desirable to implement a conveying system in which multiple conveying belts are used to provide an additional measure of quality assurance. It would be further desirable if the implemented system did not substantially increase the floor space or other costs of the manufacturing facility. It would be still further desirable if the system employed an ergonomic design that facilitated operator interaction and optimized spatial requirements of the system.

SUMMARY OF THE INVENTION

The problems identified above are in large part addressed by a conveying system according to present invention. The conveying system includes multiple conveying tracks where each track acts as the output track from one operation and the input track to a subsequent operation. When the manufacturing process at a first operational area is completed, the completed product is placed on the area's output track and conveyed to a subsequent operational area. When the processing at the subsequent area is completed, the unit is placed on the subsequent area's output track, which is a physically distinct track from the area's input track. The input and output tracks within an operational area may occupy different levels of a multi-level system in which the various levels share a common floor space footprint to conserve floor space requirements. The tracks may be configured as a pair of tracks to facilitate simultaneous processing of two products or jobs. In addition, one or more of the tracks may have a support surface that is not parallel to the manufacturing floor. A track may comprise a V-shaped rack in which a first surface of the rack is oriented at an angle with respect to the floor and in which a second surface is perpendicular to the first surface. The tilted orientation of the first surface may facilitate insertion and removal of product from totes within a confined space.

BRIEF DESCRIPTION OF THE DRAWINGS

Other objects and advantages of the invention will become apparent upon reading the following detailed description and upon reference to the accompanying drawings in which.

Figure 1:
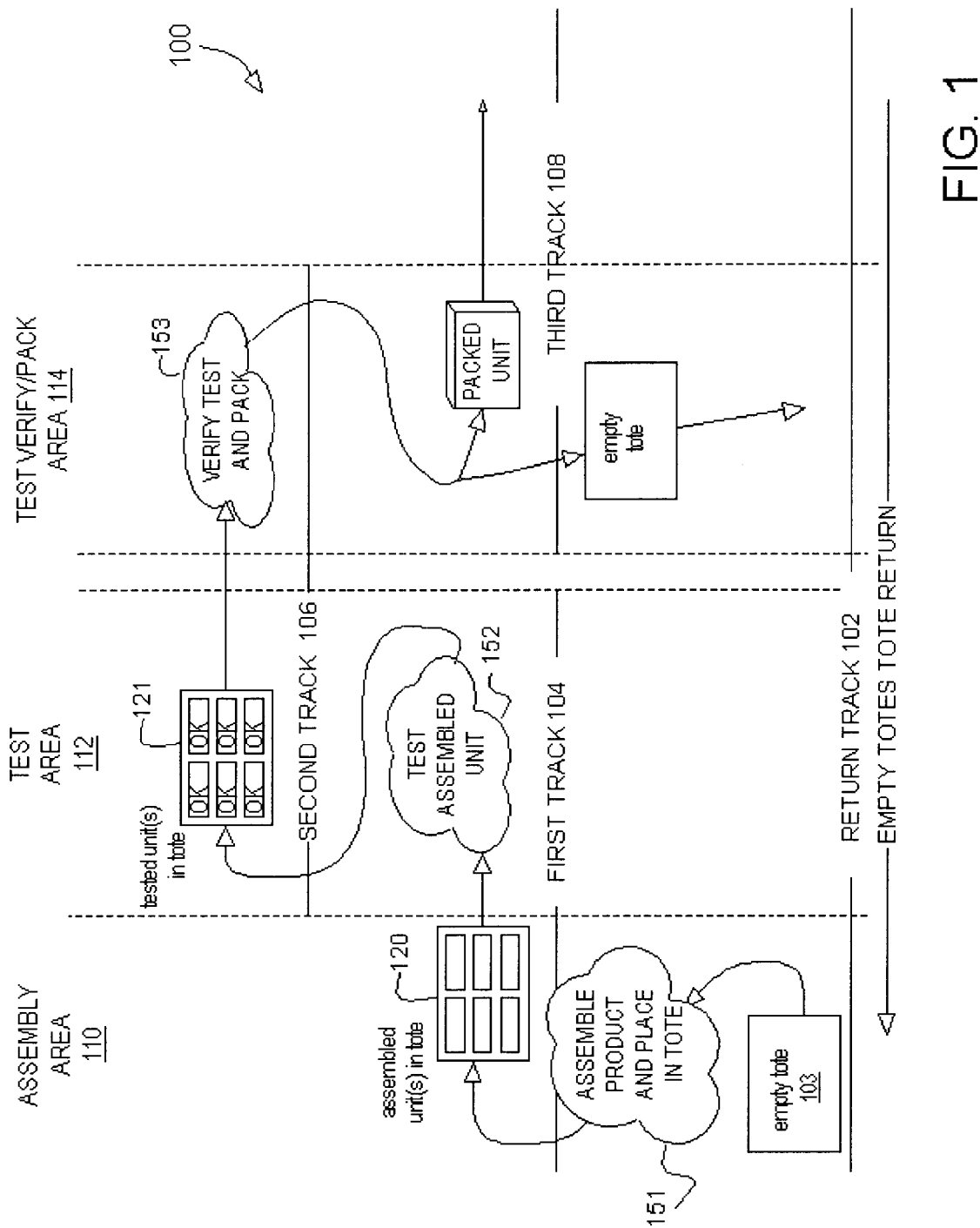
FIG. 1 is a conceptualized diagram of a conveying system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a conveying system suitable for use in a manufacturing environment. The conveying system includes a set of conveyor tracks. Each conveyor track corresponds to a particular step in the manufacturing process. Various tracks may be dedicated to, for example, assembly, test, and pack steps. Within each area, the operator has access to an input conveying track and an output conveying track. The input conveying track includes product or material to be processed within that area. When an operator completes a process step on a given unit, the completed unit is placed the area's output track.

A completed unit is then conveyed to the next operation. In this manner, the output track for a process step becomes the input track for the immediately subsequent operation. The input and output tracks are preferably vertically spaced at different over a section common floor space to conserve square footage requirements while preventing inadvertent placement of product that has not completed a step from advancing to the next step. Consistent with this passive quality assurance measure, the input track for a given process terminates within that process so that product cannot be conveyed out of a operational area on the same track on which the product arrived.

The conveying system may employ tracks having a practical and ergonomic W-shaped configuration that includes two V-shaped tracks. Each V-shaped track is designed to minimize the amount of workspace required to complete the processing step that occurs in that area. The use of two parallel V-racks enables safe processing for two different products, configurations, etc.

Referring now to the drawings, FIG. 1 is a conceptualized illustration of a conveying system and method particularly suited for application in a manufacturing environment. For purposes of this disclosure, the invention is illustrated for the sake of simplicity with an exemplary manufacturing process comprising three basic operations: assembly, test, and pack. The disclosed system and method may, however, be suitably incorporated into a manufacturing process employing a larger number of operations. In the depicted embodiment, a system 100 of conveying tracks (102, 104, 106, and 108) provides means for transporting product between the operational areas of the manufacturing plant. In the manufacturing process illustrated, the operational areas include an assembly area 110, a test area 112, and a packing area 114.

Initially, unassembled product components are provided to assembly area 110. Delivering the required components to assembly area 110 may be accomplished using a conveying track (not depicted) that leads into the assembly area, a hand cart, a loading dock or any other suitable device or mechanism. Within assembly area 110, an assembly operator assembles the necessary components in the required manner. Test area 110 may include a multitude of assembly workstations where each workstation includes the equipment, tools, and materials required for a qualified operator to assemble the product. In many manufacturing environments, work-in-progress is transported between operational areas in specialized containers commonly referred to as totes. Totes are typically customized holders that facilitate the transport of product within the manufacturing facility.

The manufacturing process depicted in FIG. 1 employs the use of totes to transport assembled product between operational areas. In one embodiment, the totes used are configured to hold several assembled products. In this embodiment, the assembly operator assembles the number of units that are capable of being held in a tote. To facilitate the assembly process, a first conveying track, identified as return track 102 in FIG. 1, serves as an assembly area input track that provides empty totes 103 to assembly area 110. In alternative embodiments, additional assembly area input tracks may provide unassembled product components or the like to assembly area 110. Return track 102 may extend all the way from packing area 114 to assembly area 110. As units are removed from their totes to be packaged at the end of the manufacturing process, empty totes 103 are placed upon return track 102, which is preferably declined from packing area 114 to assembly area 110.

An assembly operator assembles the product (as represented by block 151) and places one or more assembled products in a tote to create an assembled unit 120. The assembly operator then places assembled unit 120 on an assembly area output track for delivery to the next process in the manufacturing sequence. In the depicted embodiment, A the assembly area output track is identified as First track 104, which serves as not only the output track from assembly area 110, but also as the input track to test area 112. Like assembly area 110, test area 112 may include one or more workstations. Each workstation in test area 112 typically includes sufficient test equipment to test an assembled unit 120. First track 104 preferably extends from the beginning of assembly area 110 through the end of test area 112 so that an assembled unit 120 may be delivered to any work station in test area 112 without removing the unit from the track. This implementation beneficially minimizes handling of product during the manufacturing process. To conserve the floor space or footprint required to implement system 100, the portions of First track 104 and return track 102 within test area 112 may be laterally positioned over a common footprint of the manufacturing facility floor space such that First track 104 is directly above return track 102.

Figure 2:
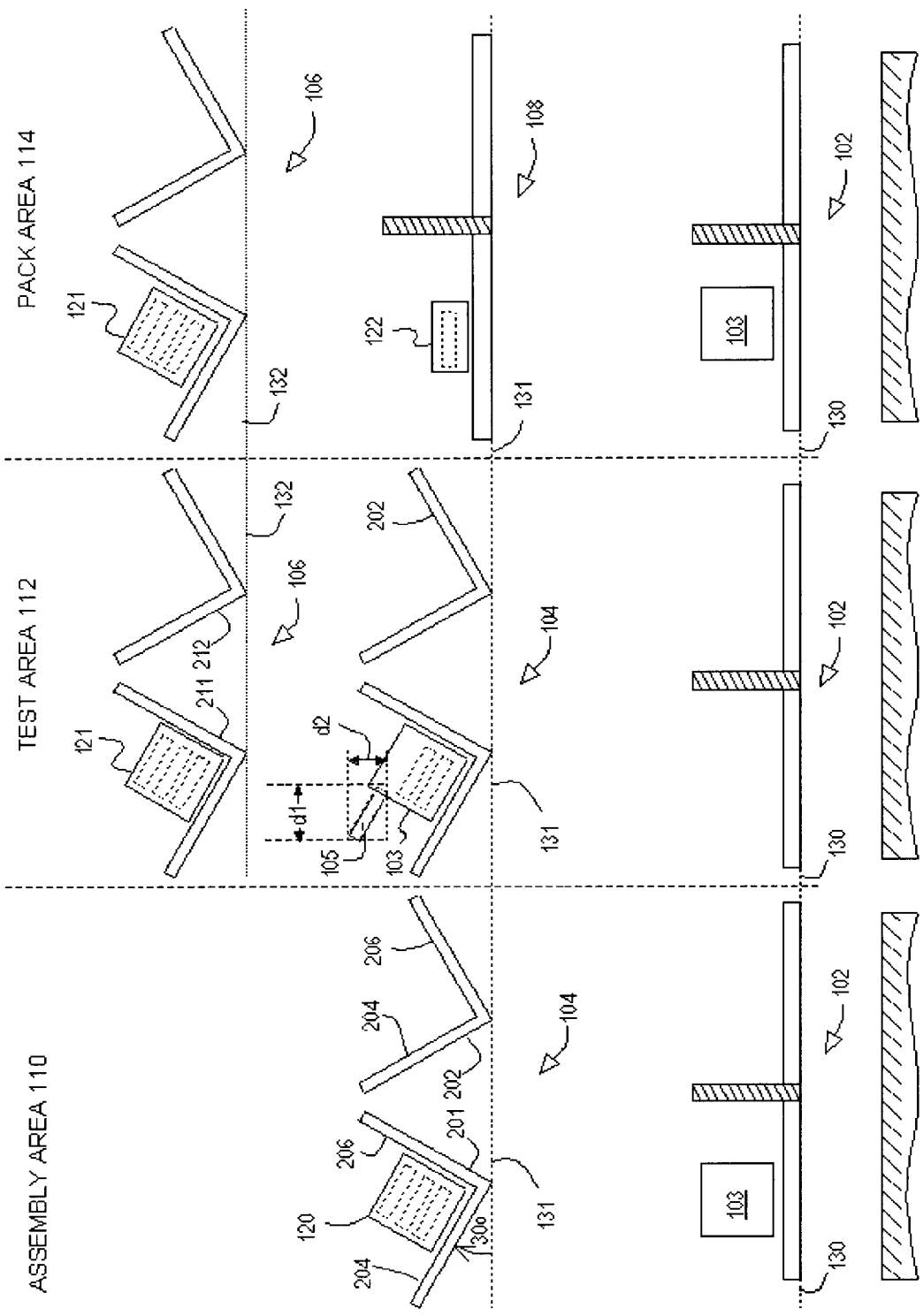
FIG. 2 is a cross-sectional view of the system of FIG. 1 taken at various stages in a manufacturing process according to one embodiment of the invention.

In one embodiment, First track 104 employs an ergonomic design that facilitates the assembly process by requiring less clearance than a conventional horizontally oriented track. Referring to FIG. 2, a cross-sectional view of assembly system 100 taken at three stages of conveying system 100 is presented. As seen in the assembly and test area portions of FIG. 2, First track 104 includes a W-shaped configuration comprising a pair of V-shaped conveying racks 201 and 202. Conveying racks 201 and 202 each include a first surface 204 and a second surface 206 that is typically perpendicular to the first surface. First surface 204 may be oriented at an angle with respect to the ground. In the depicted embodiment, for example, first surface 204 is tilted 30° from horizontal.

The non-parallel orientation of first surface 204 with respect to the ground enables operators in assembly area 110 and test area 112 to insert assembled product into and remove assembled product from tote 103 within a confined space. More specifically, the tilted orientation of assembled unit 120 upon First track 104 permits removal of an assembled product 105 within a horizontal displacement d1 and a vertical displacement d2. Displacements d1 and d2 are less than the displacement that would be required to insert product into and remove product from totes 103 either parallel or perpendicular to ground. By reducing vertical displacement d2, for example, the angled orientation of racks 201 and 202 reduces the vertical clearance required above racks 201 and 202 to insert and remove product from tote 103. The reduced clearance requirement beneficially enables another track to be located above First track 104 at a low higher height than it could be located if an operator were required to remove product from tote 103 in an entirely vertical direction.

Employing the pair of racks 201 and 202 in First track 104 beneficially enables conveying system 100 to accommodate two jobs simultaneously without fear of cross mixing. While a first product is assembled and manufactured on first rack 201, a second product may be manufactured on rack 202. In this embodiment, return track 102 and any other tracks of system 100 may also include first and second racks to accommodate two jobs throughout the manufacturing operation.

Referring again to FIG. 1, First track 104 comprises the input track that carries assembled units 120 to test area 112. Within test area 112, a test operator performs the required testing (as indicated in block 152) of the product(s) in assembled units 120. The test operation typically includes the use of specialized test equipment that may be configured to test multiple units in parallel. In one embodiment, the number of product units accommodated by totes 103 is equal to the number of product units capable of being accommodated by the test equipment.

After all product units within an assembled unit 120 have been tested, the test operator places tested units identified by reference numeral 121 on a Second track 106, which serves as the test area output track. Second track 106 typically extends from the beginning of test area 112 to the end of pack area 114 so that units on Second track 106 may be conveyed from any of the test area workstations to any of the pack area workstations.

Referring to FIG. 2 again, Second track 106 may be vertically displaced above First track 104 to conserve floor space. Moreover, Second track 106, like First track 104, may include a first rack 211 and a second rack 212 to accommodate the simultaneous processing of two products. First and second racks 211 and 212 may employ a tilted V-shape configuration in the same or a similar manner as the first and second racks 201 and 212 of First track 104.

By implementing a first track to convey product yet to be tested into test area 112 and a second, physically distinct track, to convey product that has been tested out of test area 112, conveying system 100 provides an inherent quality assurance measure because untested product on the test area input track (First track 104) cannot be conveyed out of test area 112. A test operator must physically move a unit from First track 104 to Second track 106 before the unit can be conveyed to the pack area. The likelihood of an operator inadvertently moving a unit from First track 104 to Second track 106 without testing the unit is presumably relatively remote.

Referring back to FIG. 1, tested units 121 are placed on the test area output tack (Second track 106) and conveyed out of test area 112 to pack operational area 114. In this manner, Second track 106 provides the output track for test area 112 as well as the input track to pack area 114. Pack area 114, like assembly area 110 and test area 112 may include a multiple workstations. Each pack area work station includes sufficient materials and tools for removing tested product units from their totes and packaging (block 153) them in a first package. The first package may comprise an individual package containing a single tested product unit. Individual packages may be subjected to additional packaging (not depicted) in which a group of individual packages is shrink wrapped together or otherwise collectively packaged in a group package containing multiple individual packages. After all tested product units have been removed from a tote, the empty tote 103 is placed on return track 102 to return the empty tote to assembly area 110.

The pack area workstations may also be used to verify that the test operation has been performed. In an example of this embodiment, the test operation may leave a tested unit with an altered appearance such that tested units are visibly distinguishable from untested units or units that have been tested and failed. Alternatively, test verification may be performed via a barcode scan in which part and serial numbers are compared to testing records.

Figure 3:
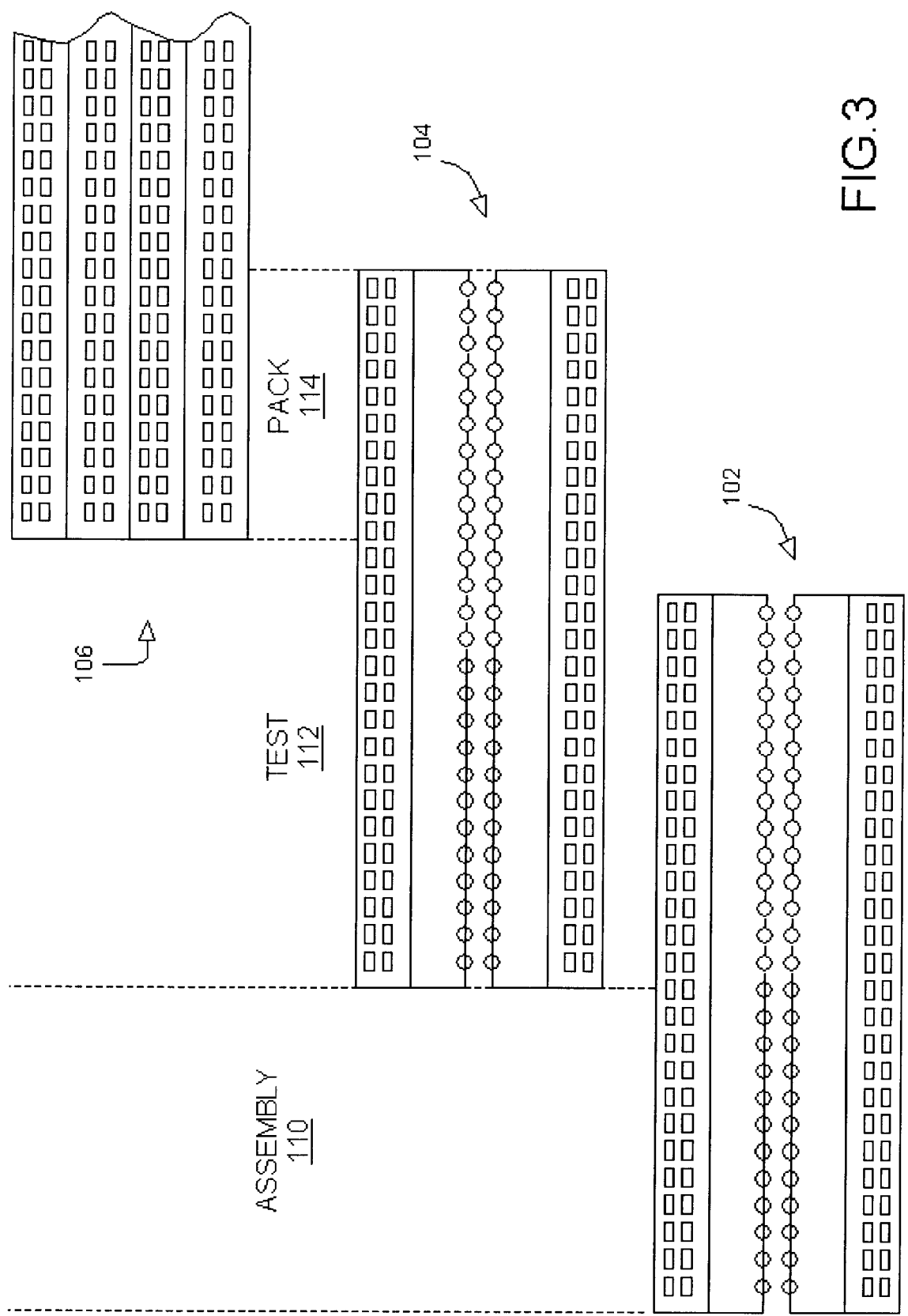
FIG. 3 is a modified top view of an embodiment of the system of FIG. 1.

Referring now to FIG. 3, a modified top view of conveying system 100 is depicted in which the various conveying tracks are illustrated as horizontally displaced with respect to one another for the sake of clarity. As depicted, return track 102 extends from the beginning of assembly area 110 to the end of test area 112. First track 104, similarly, extends from the beginning of test area 112 to the end of pack area 114 while Second track 106 extends from the beginning of packing area 114 to a next operational area, such as group packaging, that is not explicitly depicted. In no case does any track extend through three consecutive manufacturing stages.

The depicted arrangement of the various tracks beneficially accomplishes two goals. By extending each track through the subsequent operational area, the system enables product to be transported from any workstation in a first operational area to any workstation within the immediately following operational area. In addition, by limiting the extent of each track in the system to the next successive operational area, system 100 provides an additional level of quality assurance by requiring operators to move product units from an operational area's input track to the area's output track before the product unit can proceed to the next manufacturing stage.

As indicated previously, two or more tracks of system 100 may be laterally positioned over a common footprint of the manufacturing floor (i.e., placed directly above and below each other) to conserve square footage requirements. While this multi-level configuration requires additional vertical space, the number of levels required can be limited so that, for example, step ladders or other means are not required to reach the top-most level. More particularly, because each track is preferably prohibited from extending through more than two consecutive stages in manufacturing process, the successive tracks in system 100 may occupy alternating vertical positions or levels. Referring back to FIG. 2, an example of this alternating level configuration is depicted. In assembly area 110, the assembly area output track (First track 104) is vertically displaced at a first height or level indicated by reference numeral 131. In test area 112, the test area input track (First track 104) is at a first height above the manufacturing floor (first level 131) while the test area output tract (Second track 106) is positioned at a second height above the floor (second level 132). Because the First track 104 physically terminates at the end of test area 112, another track may be positioned at first level 131 in pack area 114. Accordingly, the pack area input track (Second track 106) is positioned at second level 132 while the pack area output track (Third track 108) is positioned at the first level 131. In this manner the input and output tracks for consecutive stages in the manufacturing processing can occupy alternating levels so that the amount of vertical space required to implement system 100 is contained. The depicted embodiment, for example, would require no more than three levels, namely, a dedicated level 130 for a track (return track 102) that runs the length of the manufacturing site and first and second levels 131 and 132, which alternate as the input and output track levels for consecutive stages in the process. By limiting the number of required levels to just three and by setting the dedicated level 130 close to the ground, the height of the highest level (second level 132) can typically be maintained at a height that does not require operators to use ladders. In one embodiment, for example, the dedicated level 130 is less than 12" above ground, the first level 131 is approximately 2' off the ground, and the second level 132 is approximately 3' above ground.

It will be apparent to those skilled in the art having the benefit of this disclosure that the present invention contemplates an improved conveying system that uses multiple tracks to provide inherent quality control and a vertical arranged configuration that minimizes floor space requirements. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A conveying system for use in a manufacturing plant, comprising:
    a first conveying track extending from a first operational area in which a first operation is performed and terminating in a second operational area where a second operation is performed such that the first conveying track is prevented from conveying product to a third operational area where a third operation is performed;
    a second conveying track extending from the second operational area and terminating in the third operational area such that the second conveying track is prevented from conveying product beyond the third operational area; and
    a third conveying track extending from the third operational area, wherein the first and third conveying tracks are vertically positioned at a first displacement above a floor of the manufacturing plant and wherein the second conveying track is vertically positioned at a second displacement above the floor.

2. The system of claim 1, wherein the second operation is the next successive operation performed after the first operation and the third operation is the next successive operation performed after the second operation.

3. The system of claim 1, wherein the first operation comprises an assembly operation, the second operation comprises a test operation, and the third operation comprises a packing operation.

4. The system of claim 1, wherein the first track terminates in close proximity to the origin of the third track.

5. The system of claim 1, wherein the portions of the first and second conveying tracks within the second operational are laterally positioned over a common footprint of the manufacturing plant floor.

6. The system of claim 5, wherein the portions of the second and third conveying tracks within the third operational area are laterally displaced above a common footprint of the plant floor.

7. The system of claim 1,
wherein the first, second, and third conveying tracks each include a first rack suitable for conveying product associated with a first job and a second rack substantially parallel to the first rack suitable for conveying product associated with a second job.

8. The system of claim 7, wherein the first and second racks of at least the first conveying track each include a first surface and a second surface that is substantially perpendicular to the first surface.

9. The system of claim 8, wherein the first surface of the first rack is angled with respect to the plant floor.

10. The system of claim 1,
further comprising a return track extending and declined from an end of the manufacturing plant to the first operational area.

11. A conveying system for use in a manufacturing plant, comprising;
a set of conveying tracks, each track comprising an output track for a corresponding operational area and an input track for the next successive operational area in the manufacturing plant;
wherein each of the set of conveying tracks originates in its corresponding operational area and terminates in the next successive operational area such that each of the set of tracks is prevented from conveying product beyond the next successive operational area and further wherein the portions of adjacent tracks within a common operational area vertically positioned at different heights above a floor of the manufacturing plant.

12. The system of claim 11, wherein the portions of adjacent tracks within a common operational area are laterally positioned above a common footprint of the manufacturing floor.

13. The system of claim 11, wherein each of the set of conveying tacks extends from a beginning of its corresponding operational area to an end of the next successive operational area such that each conveying track is accessible to any of a plurality of workstations in the track's corresponding operational area and to any of a plurality of workstations in the next successive operational area.

14. The system of claim 11, wherein alternating conveying tracks are vertically positioned at the same height above the manufacturing floor.

15. The system of claim 11,
rack suitable for conveying a first product and a second rack substantially parallel to the first rack and suitable for conveying a second product.

16. The system of claim 15, wherein the first and second racks for at least one of the conveying tracks each comprises a V-shaped rack including a first surface and a second surface substantially perpendicular to the first surface, wherein the first surfaces are angled with respect to the manufacturing floor.

17. The system of claim 16, wherein the angle of the first surface with respect to the manufacturing floor is determined to minimize the displacement required to remove product from its corresponding rack.

18. A method of conveying product within a manufacturing plant, comprising:
responsive to performing a first operation in a first operational area of the plant, placing the resulting product on a first conveying track that originates in the first operational area and terminates in a second operational area;
conveying the product to the second operational area via the first conveying track;
responsive to performing a second operation in the second operational area wherein the second operation is the next successive operation performed after the first operation, placing the resulting product on a second conveying track that originates in the second operational area and terminates in a third operational area;
conveying the product to the third operational area via the second conveying track;
responsive to performing a third operation in the third operational area wherein the third operation is the next successive operation performed after the second operation, placing the resulting product on a third conveying track that originates in the third operational area, wherein the first conveying track is vertically positioned at a first displacement above a floor of the manufacturing plant and wherein the second conveying track is vertically positioned at a second displacement above the floor.

19. The method of claim 18, wherein the portions of the first and second conveying tracks within the second operational are laterally positioned over a common footprint of the manufacturing plant floor and wherein the portions of the second and third conveying tracks within the third operational area are laterally displaced above a common footprint of the plant floor.

20. The method of claim 18, wherein the first, second, and third conveying tracks each include a first rack suitable for conveying product associated with a first job and a second rack substantially parallel to the first rack suitable for conveying product associated with a second job.

21. The method of claim 18, wherein the first operation comprises an assembly operation, the second operation comprises a test operation, and the third operation comprises a packing operation.

* * * * *